United States Patent
Kumai et al.

(10) Patent No.: US 9,855,907 B2
(45) Date of Patent: Jan. 2, 2018

(54) SENSOR RETAINER ASSEMBLY FOR VEHICLE

(71) Applicant: TOYOTA JIDOSHA KABUSHIKI KAISHA, Toyota-shi, Aichi-ken (JP)

(72) Inventors: Yuichi Kumai, Gotemba (JP); Jun Sato, Susono (JP); Tomoyuki Kuriyama, Hadano (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/278,360

(22) Filed: Sep. 28, 2016

(65) Prior Publication Data

US 2017/0088077 A1   Mar. 30, 2017

(30) Foreign Application Priority Data

Sep. 29, 2015  (JP) .................. 2015-191271

(51) Int. Cl.
*B60R 19/48* (2006.01)

(52) U.S. Cl.
CPC ................. *B60R 19/483* (2013.01)

(58) Field of Classification Search
CPC .................................... B60R 19/483
USPC .............. 293/117, 155; 296/29, 30
See application file for complete search history.

(56) References Cited

U.S. PATENT DOCUMENTS

| | | | |
|---|---|---|---|
| 6,496,138 B1* | 12/2002 | Honma | G01S 13/931 342/27 |
| 6,729,429 B2* | 5/2004 | Takahashi | B60R 19/483 180/271 |
| 8,744,743 B2* | 6/2014 | Kawasaki | B60R 19/483 180/68.1 |
| 2009/0001759 A1* | 1/2009 | Kondo | B60R 19/483 296/187.03 |
| 2011/0018309 A1* | 1/2011 | Mikutsu | B60R 19/48 296/187.11 |
| 2013/0239425 A1* | 9/2013 | Ham | G01B 5/24 33/533 |
| 2014/0070982 A1* | 3/2014 | Inada | B60R 19/483 342/188 |

FOREIGN PATENT DOCUMENTS

| | | |
|---|---|---|
| JP | S60-123680 U | 8/1985 |
| JP | H04-310479 A | 11/1992 |
| JP | 2002-264743 A | 9/2002 |
| JP | 2007-030534 A | 2/2007 |
| JP | 2007-106199 A | 4/2007 |

\* cited by examiner

*Primary Examiner* — Jason S Morrow
*Assistant Examiner* — E Turner Hicks
(74) *Attorney, Agent, or Firm* — Andrews Kurth Kenyon LLP

(57) ABSTRACT

A sensor retaining assembly is provided to prevent changes in orientations of the sensors. The sensor retainer assembly comprises: a bumper reinforcement extending laterally in the vehicle; a frame member of a chassis; a rigid member integrated with the frame member; and a connection member on which sensors are installed while being adjacent to each other. One end of the connection member is fixed to the bumper reinforcement, and the other end of the connection member is fixed to the frame member or the rigid member.

4 Claims, 4 Drawing Sheets

SENSOR RETAINER ASSEMBLY FOR VEHICLE

CROSS REFERENCE TO RELATED APPLICATIONS

The present application claims the benefit of priority to Japanese Patent Application No. 2015-191271 filed on Sep. 29, 2015 with the Japanese Patent Office, the entire contents of which are incorporated herein by reference in its entirety.

BACKGROUND

Field of the Disclosure

Embodiments of the present application relates to the art of a retainer assembly for fixing an external sensor to a vehicle body.

Discussion of the Related Art

JP-A-2007-106199 describes a vehicle periphery monitor device. According to the teachings of JP-A-2007-106199, a radar stay is attached to a frame plate in a side mirror or a bumper stay in such a manner as to extend horizontally, and a leading end of the radar stay is bent vertically upwardly so that the radar for detecting environmental conditions is attached thereto.

JP-A-4-310479 describes a front body structure of automobile for improving rigidity of a front fender liner forming a wheel house. According to the teachings of JP-A-2007-106199, a front portion of the front fender liner is connected to a front side member through a bracket, a front upper end portion of the front fender liner is connected to a fender apron, and an intermediate portion between front portion and the front upper end portion of the front fender liner is connected to a front bumper side support.

According to the teachings of JP-A-2007-106199, the radar stay supporting the radar is supported at one side and hence the orientation of the sensor may be changed elastically by vibration of the vehicle body. Consequently, a distance from the vehicle to an external obstacle may not be measured accurately during propulsion of the vehicle. Especially, given that a plurality of different sensors are supported by a common stay, the stay may deformed significantly by the vibrations.

SUMMARY

Aspects of the present application have been conceived noting the foregoing technical problems, and it is therefore an object of the present application is to provide a sensor retaining assembly for retaining a plurality of adjoining vehicle sensors firmly to prevent changes in orientations of the sensors resulting from vibrations of the vehicle.

An embodiment of the present application relates to a sensor retainer assembly for a vehicle having a plurality of sensors for detecting for detecting environmental conditions. In order to achieve the above-explained objective, the sensor retainer assembly is provided with: a bumper reinforcement that extends laterally in the vehicle to absorb collision impact applied to the vehicle from front side or rear side of the vehicle; a frame member of a chassis; a rigid member integrated with the frame member; and a connection member in which one of end portions is fixed to the bumper reinforcement and the other end portion is fixed to at least one of the frame member and the rigid member. In addition, the sensors are installed onto the connection member while being adjacent to each other.

In a non-limiting embodiment, the connection member may include a bracket attached to an outer surface of the connection member, and at least one of the sensors may be installed onto the bracket.

In a non-limiting embodiment, the connection member may further include: a first installation member that is connected to the bumper reinforcement; and a second installation member in which one of end portions is connected to the first installation member and the other end portion is connected to at least one of the frame member and the rigid member.

In a non-limiting embodiment, the connection member may further include a first mounting surface on which one of the sensors is installed and a second mounting surface on which another sensor is installed. In addition, at least any one of an orientational correlation between the first mounting surface and the second mounting surface in any of a pitching direction, a yawing direction and a rolling direction, and levels of the first mounting surface and the second mounting surface in a height direction may be differentiated from each other.

In a non-limiting embodiment, the connection member may be formed into V-shape. In this case, one of the sensors is installed onto the first mounting surface between one of side edges of the connection member and a reference line, and another sensor is installed onto the second mounting surface between the reference line and other side edge of the connection member.

Thus, according to the embodiment of the present application, one end of the connection member is connected to the bumper reinforcement and other end of the connection member is connected to the rigid member integrated with the frame member, and the sensors are installed onto the connection member while being adjacent to each other. According to the embodiment, therefore, the connection member can be supported firmly at its both ends to be integrated with the frame member of chassis. For this reason, orientations of the sensors can be kept correctly to an orientation of the vehicle to reduce a detection error even if the vehicle is vibrated.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENTS

Preferred embodiments of the present application will now be explained with reference to the accompanying drawings. For example, in an autonomous vehicle, a plurality of different sensors such as a laser radar, a millimeter-wave radar and so on are arranged to measure a distance to an external obstacle around the vehicle based on detection signals from those sensors.

Figure 3:
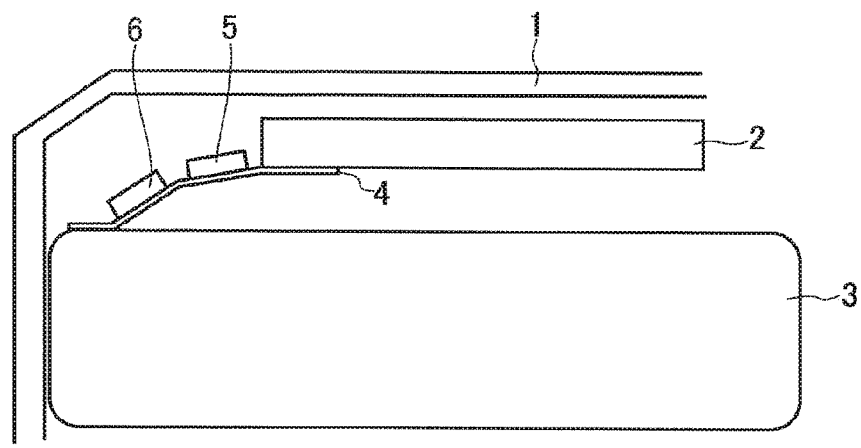
FIG. 3 is a schematic illustration showing one example of a structure of the sensor retaining assembly according to the embodiment.

Referring now to now to FIG. 3, there is shown one example of a structure of a sensor retainer assembly arranged at a corner of the vehicle. Although FIG. 3 shows the front left corner of the vehicle, the sensor retainer assembly may be applied to every corner of the vehicle.

In the example shown in FIG. 3, a bumper reinforcement 2 extends laterally inside of a bumper 1 while keeping a predetermined clearance therebetween. The bumper reinforcement 2 is deformed inwardly by a longitudinal impact applied to the vehicle from front side or rear side of the vehicle to absorb collision energy. To this end, the bumper reinforcement 2 is formed into a hollow structure by a roll-forming method.

Each width end of the bumper reinforcement 2 is individually connected to a front side member of a chassis 3 through a crash box (not shown) that is deformed by a collision impact applied thereto from the front side of the vehicle to absorb a collision energy. The front side member is made of metal material having relatively high rigidity in order not to be deformed or compressed by the collision impact applied from the front side of the vehicle. A rear end of each of the front side member is individually connected to a cross member of the chassis 3 extending laterally in front of a vehicle compartment. In the following explanation, those frame members of the chassis 3 will be simply called the chassis 3.

In the example shown in FIG. 3, the width end of the bumper reinforcement 2 is connected to the chassis 3 through a connection member 4 made of metal. Specifically, one of width ends of the connection member 4 is attached to a back face (or rear face) of the width end of the bumper reinforcement 2 by a bolt or the like. An intermediate portion of the connection member 4 is bent inwardly toward the rear side of the vehicle, and the other width end of the connection member 4 is attached to the front left corner of the chassis 3.

A laser radar 5 and a millimeter-wave radar 6 are installed onto a front face (i.e., a mounting surface) of the connection member 4 while being adjacent to each other, and detectable width of those sensors are different. Specifically, the laser radar 5 is disposed on the bumper reinforcement 2 side, and the millimeter-wave radar 6 is disposed on the width end side. As described, since the intermediate portion of the connection member 4 is withdrawn toward the rear side of the vehicle, the millimeter-wave radar 6 is oriented laterally outwardly in comparison with the laser radar 5.

Thus, one of the width ends of the connection member 4 is fixed to the bumper reinforcement 2 and the other width end of the connection member 4 is fixed to the chassis 3. That is, the connection member 4 is supported firmly at its both ends so that rigidity of the connection member 4 can be enhanced. In addition, since the bumper reinforcement 2 is integrated with the side members of the chassis 3, the connection member 4 can be fixed firmly between the bumper reinforcement 2. For this reason, the connection member 4 is vibrated together with the bumper reinforcement 2 and the chassis 3 at same frequency. That is, orientations of the laser radar 5 and the millimeter-wave radar 6 will not be changed from an orientation of the vehicle so that detection errors of those radars 5 and 6 can be reduced. Further, since the millimeter-wave radar 6 is situated away from the bumper reinforcement 2, a detection error of the millimeter-wave radar 6 will not be increased by reflection in the hollow space of the bumper reinforcement 2.

Figure 4:
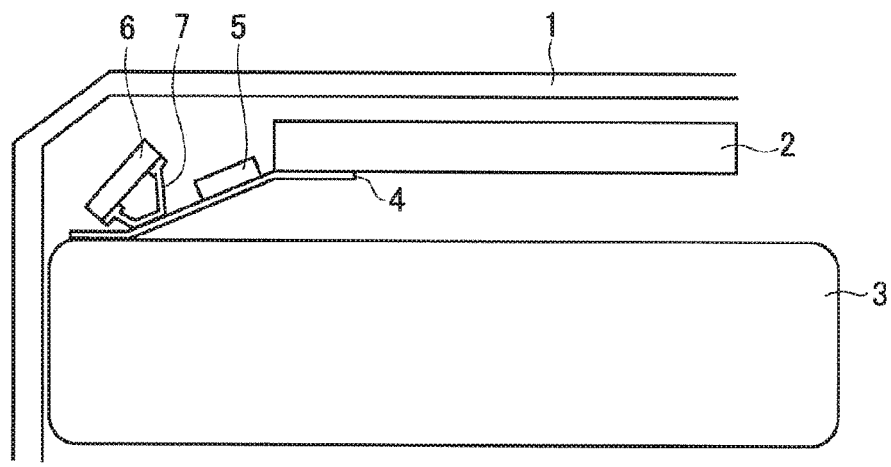
FIG. 4 is a schematic illustration showing an example of attaching a bracket to the connection member.

Turning to FIG. 4, there is shown another example of changing an orientation of the radars 5 and 6. According to the example shown in FIG. 4, a bracket 7 is attached to the connection member 4, and the millimeter-wave radar 6 is installed onto a mounting surface of the bracket 7. In this case, an angle of the mounting surface of the bracket 7 with respect to the mounting surface of the connection member 4 may be adjusted arbitrarily e.g., in a yawing direction and a pitching direction. Alternatively, the angle of the mounting surface of the bracket 7 with respect to the mounting surface of the connection member 4 may also be adjusted in such a manner that the mounting surface of the bracket 7 is situated parallel to the mounting surface of the connection member 4 in the yawing direction or the pitching direction.

Figure 5:
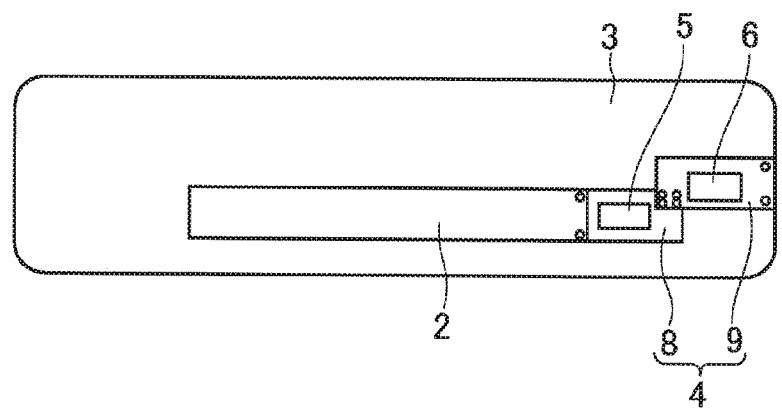
FIG. 5 is a schematic illustration showing an example of arranging the connection members at different levels.

As shown in FIG. 5, the laser radar 5 and the millimeter-wave radar 6 may also be arranged at different levels from a road surface according to need. In this case, the connection member 4 is formed of a first installation member 8 and a second installation member 9, and the levels of the installation members 8 and 9 are adjusted in a height direction of the vehicle. Specifically, one of width ends of the first installation member 8 is connected to the bumper reinforcement 2 by a bolt or the like, and an upper corner of the other width end of the first installation member 8 is connected to a lower corner of one of width ends of the second installation member 9 by a bolt or the like. The other width end of the second installation member 9 is connected to the chassis 3 by a bolt or the like. In this case, the laser radar 5 is installed onto the mounting surface of the first installation member 8, and the millimeter-wave radar 6 is installed onto the mounting surface of the second installation member 9. Installation angles of the laser radar 5 and the millimeter-wave radar 6 may also be adjusted arbitrarily e.g., in the rolling direction.

Figure 6:
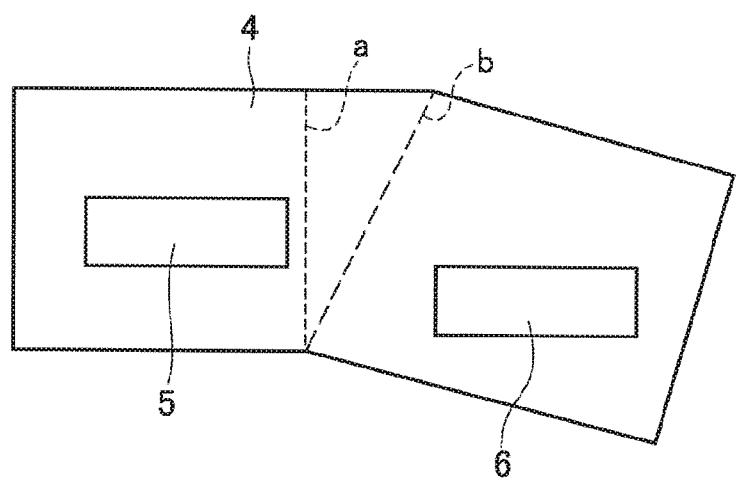
FIG. 6 is a schematic illustration showing an example of differentiating orientations of sensors by bending the connection member.

FIG. 6 shows an example of changing orientations of the laser radar 5 and the millimeter-wave radar 6 in the pitching direction. In this case, the connection member 4 is shaped into V-shape (depicted as inverted V-shape in FIG. 6), and the connection member is folded along a folding line "b" inclined with respect to a reference line "a" parallel to one of side edges of the connection member 4. In other words, the connection member is folded along the folding line "b" connecting an upper bend point and a lower bend point of the connection member 4. In this case, the laser radar 5 is installed onto the mounting surface of the connection member 4 between said one of side edges and the reference line "a", and the millimeter-wave radar 6 is installed onto the mounting surface of the connection member 4 between the folding line "b" and other side edge of the connection member 4.

Figure 1:
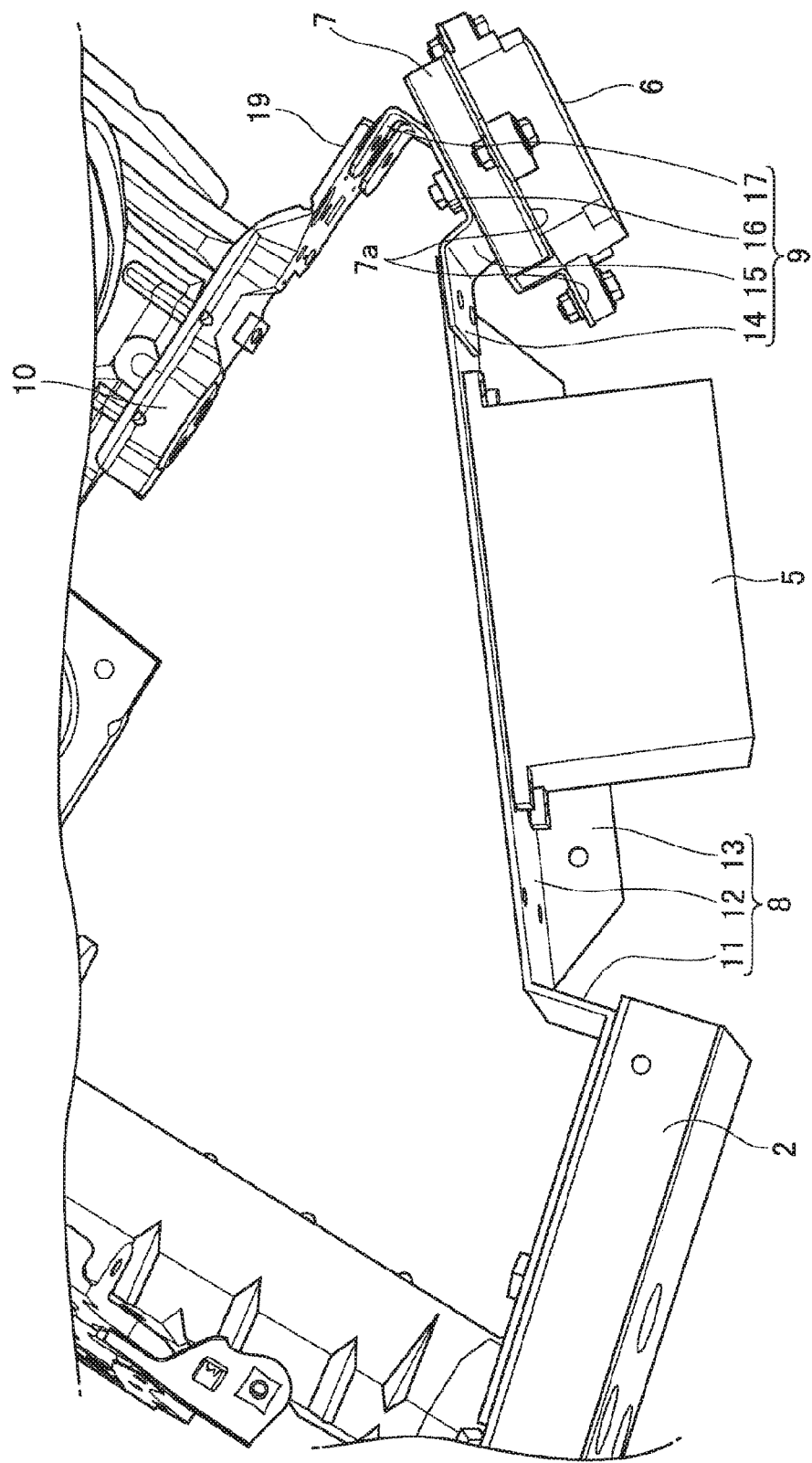
FIG. 1 is a top view showing the connection member connected to a bumper reinforcement and to a front fender apron, and the sensor attached to the connection member.
Figure 2:
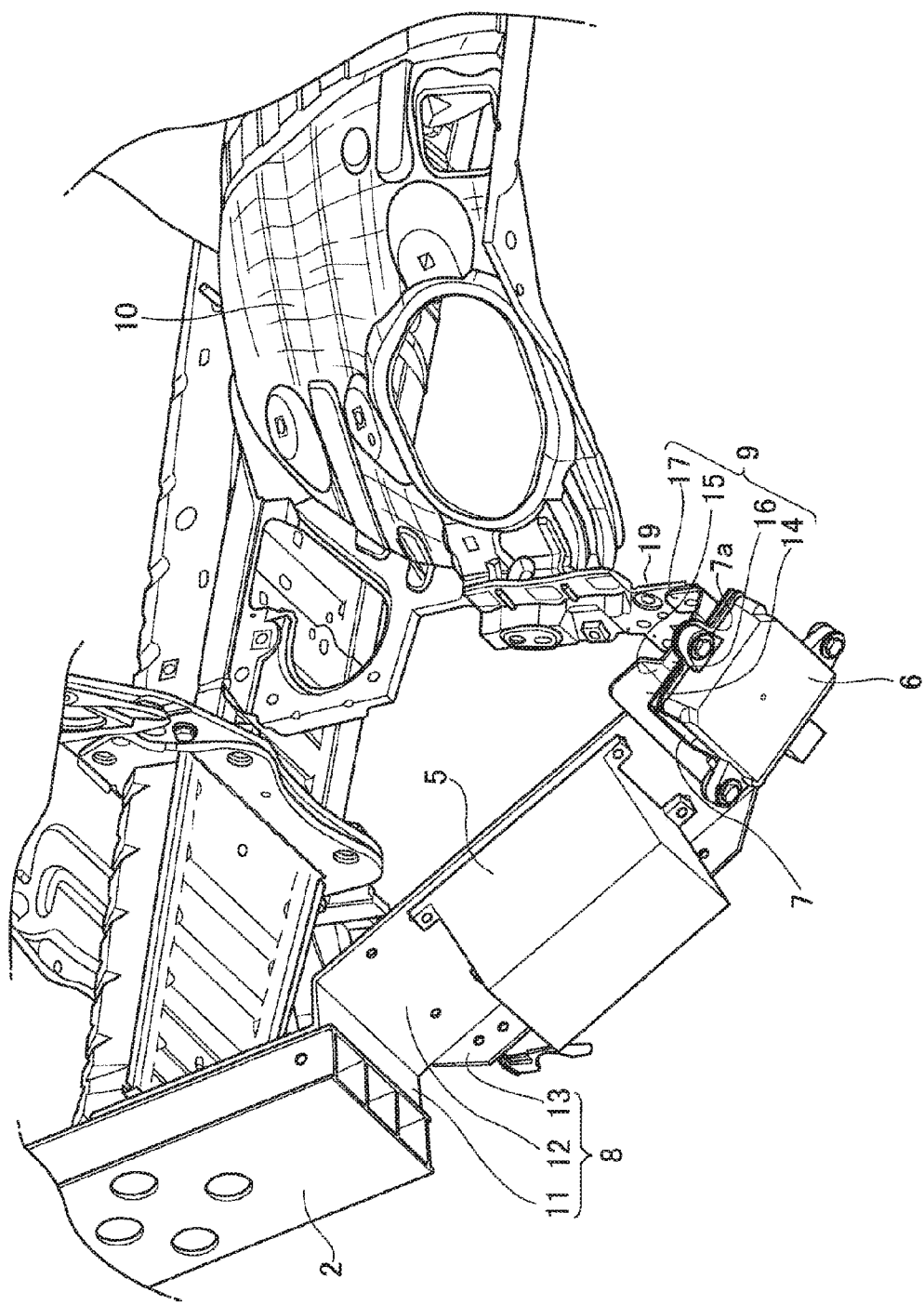
FIG. 2 is a perspective view of the sensor retaining assembly.

The connection member 4 may also be fixed indirectly to the chassis 3 through a rigid member, and such example is shown in FIGS. 1 and 2. In the example shown in FIGS. 1 and 2, specifically, the connection member 4 is connected to the bumper reinforcement 2 and to a front fender apron 10. Here, the lower left side in FIG. 1 corresponds to the front side of the vehicle, and the left side in FIG. 2 corresponds to the front side of the vehicle.

In the example shown in FIGS. 1 and 2, the connection member 4 includes the first installation member 8 and the second installation member 9. One of width end portions of the first installation member 8 is an attaching portion fixed to a back face of the bumper reinforcement 2, and the first installation member 8 is bent substantially at right angle at a leading end of the bumper reinforcement 2 toward the rear side of the vehicle to form a withdrawal portion 11. The withdrawal portion 11 of the first installation member 8 is bent at a predetermined point to form a mounting portion 12 extending widthwise but slightly toward the rear side of the vehicle, and the laser radar 5 is fixed to a mounting surface of the mounting portion 12 by a blot or the like. An angle between the withdrawal portion 11 and the mounting portion 12 may be adjusted arbitrarily to orient the laser radar 5 to a desired orientation, and a length of the withdrawal portion 11 may be adjusted arbitrarily to withdraw the laser radar from the bumper (not shown). In order to enhance rigidity of the mounting portion 12, a reinforcement portion 13 protrudes from a lower end of the mounting portion 12 toward the front side of the vehicle.

A threaded hole is formed on the other width end portion of the first installation member 8, that is, on the leading end portion of the mounting portion 12, and a first attaching portion 14 of the second installation member 9 is fixed to the leading end portion of the mounting portion 12 of the first installation member 8 by a bolt.

The attaching portion 14 of the second installation member 9 is bent outwardly at the leading end of the mounting portion 12 to form a protruding portion 15, and the protruding portion 15 is bent at a predetermined point to form a mounting portion 16 extending widthwise but slightly toward the rear side of the vehicle. A leading end portion of the mounting portion 16 is bent inwardly toward the rear side of the vehicle to form a second attaching portion 17 connected to the front fender apron 10. Thus, the second installation member 9 is shaped into crank-shape. The above-mentioned bracket 7 on which the millimeter-wave radar 6 is installed is attached to the mounting portion 16.

In order to reduce a detection error of the millimeter-wave radar 6 resulting from reflection in the hollow space of the bumper reinforcement 2, and to adjust a distance between the millimeter-wave radar 6 and the bumper (not shown), the bracket 7 is formed in such a manner as to protrude the millimeter-wave radar 6 outwardly.

Specifically, a base portion of the bracket 7 is attached to a mounting surface as an outer surface of the mounting portion 16 of the second installation member 9 by a bolt. An upper end portion of the base portion of the bracket 7 is bent outwardly to form an upper adjuster portion, and a leading end of the upper adjuster portion is bent upwardly to form an attaching portion 7a. Likewise, a lower end portion of the base portion of the bracket 7 is also bent outwardly to form a lower adjuster portion, and a leading end of the lower adjuster portion is also bent downwardly to form another attaching portion 7a.

A protruding length of each of the adjuster portion is adjusted in such a manner that each of the attaching portion 7a is not protruded from a front face of the bumper reinforcement 2, and the millimeter-wave radar 6 is attached to the attaching portion 7a by bolts. In addition, an angle between the protruding portion 15 and the mounting portion 16 is adjusted in such a manner as to orient the millimeter-wave radar 6 to a desired orientation.

The front fender apron 10 as the rigid member is formed of metal material having high rigidity to enhance rigidity of a suspension tower (not shown). Specifically, the front fender apron 10 is integrated with a side member of the chassis (neither of which are shown), and a fender line (not shown) is attached to the front fender apron 10 from outside. The second attaching portion 17 of the second installation member 9 is fixed to a mounting surface of a front end 19 of the front fender apron 10 by a bolt.

Thus, in the example shown in FIGS. 1 and 2, the connection member 4 may also be integrated with the frame member such as the front fender apron 10 to form a rigid assembly. According to the example shown in FIGS. 1 and 2, therefore, the above-explained advantages of the example shown in FIG. 3 may also be achieved.

Although the above exemplary embodiments of the present application have been described, it will be understood by those skilled in the art that the present application should not be limited to the described exemplary embodiments, and various changes and modifications can be made within the spirit and scope of the present application.

What is claimed is:

1. A sensor retainer assembly for a vehicle having a plurality of sensors for detecting environmental conditions, comprising:
   a bumper reinforcement that extends laterally in the vehicle to absorb collision impact applied to the vehicle from front side or rear side of the vehicle;
   a frame member of a chassis;
   a rigid member integrated with the frame member; and
   a connection member in which one of the end portions is fixed to the bumper reinforcement and the other end portion is fixed to at least one of the frame member and the rigid member,
   wherein the sensors are installed onto the connection member while being adjacent to each other, and
   wherein the connection member includes: a first installation member that is connected to the bumper reinforcement; and a second installation member in which one of the end portions is connected to the first installation member and the other end portion is connected to at least one of the frame member and the rigid member.

2. The sensor retainer assembly for a vehicle as claimed in claim 1,
   wherein the connection member includes a bracket attached to an outer surface of the connection member, and
   wherein at least one of the sensors is installed onto the bracket.

3. The sensor retainer assembly for a vehicle as claimed in claim 1,
   wherein the connection member includes a first mounting surface on which one of the sensors is installed and a second mounting surface on which another sensor is installed, and
   wherein at least any one of an orientational correlation between the first mounting surface and the second mounting surface in any of a pitching direction, a yawing direction and a rolling direction, and levels of the first mounting surface and the second mounting surface in a height direction is differentiated from each other.

4. The sensor retainer assembly for a vehicle as claimed in claim 3,
   wherein the connection member is formed into V-shape, and
   wherein one of the sensors is installed onto the first mounting surface between one of side edges of the connection member and a reference line, and another sensor is installed onto the second mounting surface between the reference line and other side edge of the connection member.

\* \* \* \* \*